United States Patent

Skrzypek

Patent Number: 6,158,099
Date of Patent: Dec. 12, 2000

[54] EXTRACTION TOOL FOR HEAD REST RETAINER SLEEVE

[75] Inventor: Kenneth P. Skrzypek, Livonia, Mich.

[73] Assignee: Atoma International Inc., Aurora, Canada

[21] Appl. No.: 09/136,673

[22] Filed: Aug. 19, 1998

Related U.S. Application Data

[60] Provisional application No. 60/056,539, Aug. 19, 1997.

[51] Int. Cl.[7] ................................................ B23P 19/04
[52] U.S. Cl. .............................. 29/255; 29/282; 29/244; 29/263; 29/278; 29/426.1
[58] Field of Search ............................ 29/244, 255, 258, 29/259, 260, 261, 262, 263, 265, 268, 278, 282

[56] References Cited

U.S. PATENT DOCUMENTS

| | | | |
|---|---|---|---|
| Re. 36,009 | 12/1998 | Shultz | 29/898.08 |
| 366,163 | 7/1887 | Geyer . | |
| 1,403,754 | 1/1922 | Erickson . | |
| 1,598,887 | 9/1926 | Smith . | |
| 1,632,720 | 6/1927 | Worster . | |
| 1,640,489 | 8/1927 | Donowho et al. . | |
| 1,650,023 | 11/1927 | Maxwell . | |
| 1,650,964 | 11/1927 | Schmitt . | |
| 1,776,194 | 9/1930 | Leftwich . | |
| 2,052,304 | 8/1936 | Kaplan | 29/88.2 |
| 2,376,721 | 5/1945 | Piper | 29/261 |
| 2,377,304 | 6/1945 | Appel | 29/255 |
| 2,386,253 | 10/1945 | Meyer | 29/265 |
| 2,646,619 | 7/1953 | McCord | 29/263 |
| 3,052,973 | 9/1962 | Williams | 29/265 |
| 3,055,093 | 9/1962 | Ruble | 29/265 |
| 3,588,983 | 6/1971 | Hoy | 29/203 |
| 3,611,540 | 10/1971 | Gibu | 29/263 |
| 3,669,481 | 6/1972 | Bergmann | 292/49 |
| 4,173,813 | 11/1979 | Stockinger | 29/266 |
| 4,369,569 | 1/1983 | Armstrong, Jr. et al. | 29/726 |
| 4,489,979 | 12/1984 | Zyngier | 297/391 |
| 4,507,837 | 4/1985 | Hinkle | 29/262 |
| 4,624,041 | 11/1986 | Gathright et al. | 29/263 |
| 4,624,585 | 11/1986 | Nix et al. | 384/296 |
| 4,750,878 | 6/1988 | Nix et al. | 384/296 |
| 4,852,235 | 8/1989 | Trease et al. | 29/263 |
| 5,305,627 | 4/1994 | Quincey et al. | 72/370 |
| 5,875,534 | 3/1999 | Jackson | 29/255 |

FOREIGN PATENT DOCUMENTS 0599056  10/1993   European Pat. Off. .

*Primary Examiner*—David P. Bryant
*Assistant Examiner*—Essama Omgba
*Attorney, Agent, or Firm*—Howard & Howard

[57] ABSTRACT

An extraction tool for extracting a head rest retainer sleeve from a vehicle seat assembly comprising a tubular member seated within an opening in the vehicle seat assembly. The tubular member has a first end adjacent the opening and a second end disposed in the seat. A cylindrical, elongated retainer sleeve is received in the tubular member for slidably receiving a mounting post of a head rest. The retainer sleeve has a head portion covering the first end of the tubular member, a plurality of flexible locking wedges for engaging the second end of the tubular member to retain the sleeve in the tubular member and seat, and an inner wall defining an aperture extending between the head portion and the locking wedges for receiving the mounting post of the head rest. The extraction tool includes an cylindrical, elongated body member having upper and lower ends. The upper end includes a gripping surface for positioning the extraction tool into the retainer sleeve and the lower end includes an engagement extraction member slidably received within the retainer sleeve for engaging and compressing the locking wedges to unlock the sleeve from the tubular member. The engagement extraction member includes a plurality of flexible finger elements corresponding with the locking wedges and extending upwardly and outwardly from the body member which engage and compress the locking wedges inwardly and away from the tubular member to allow the retaining sleeve to be removed from the tubular member on the extraction tool.

9 Claims, 4 Drawing Sheets

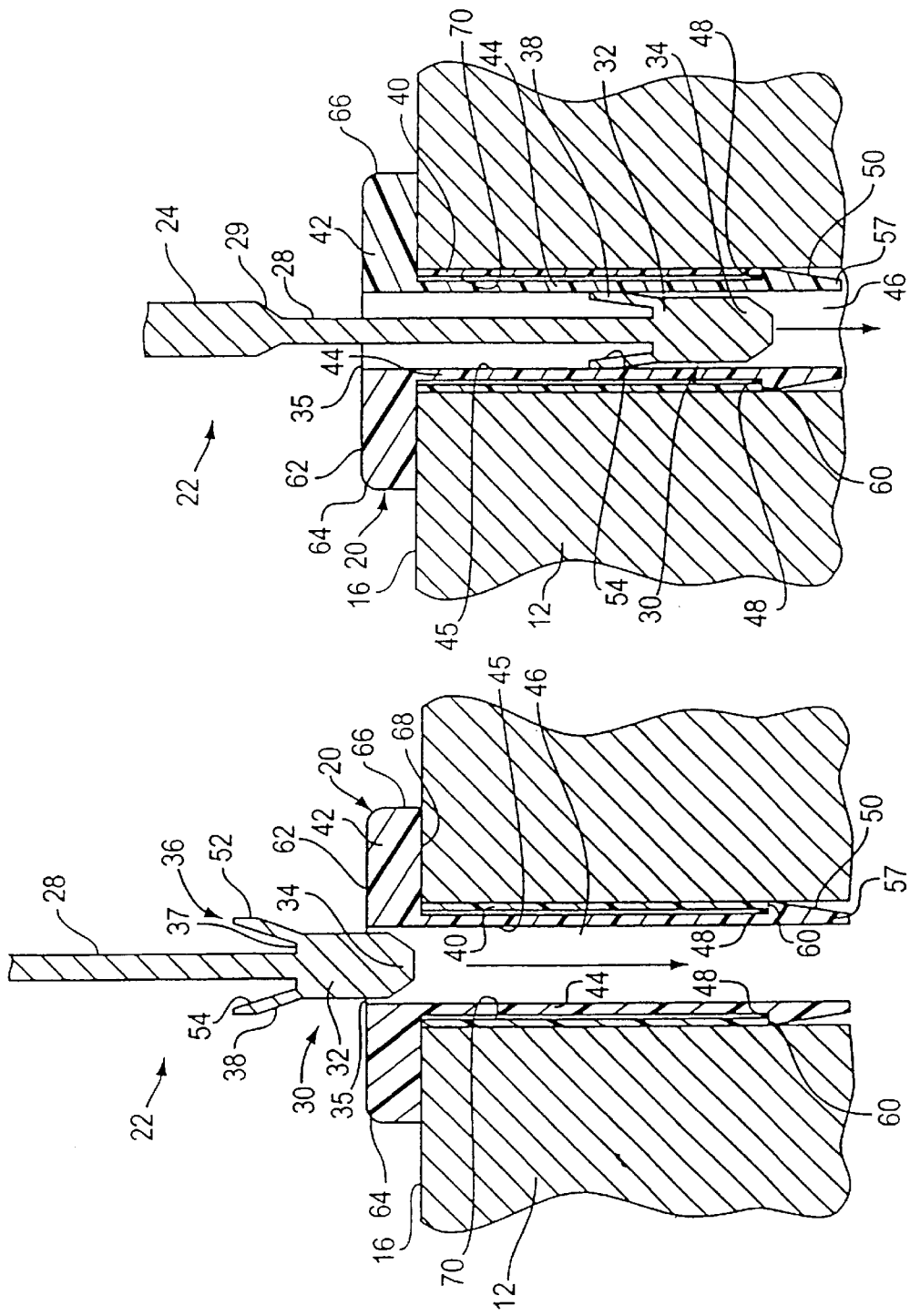

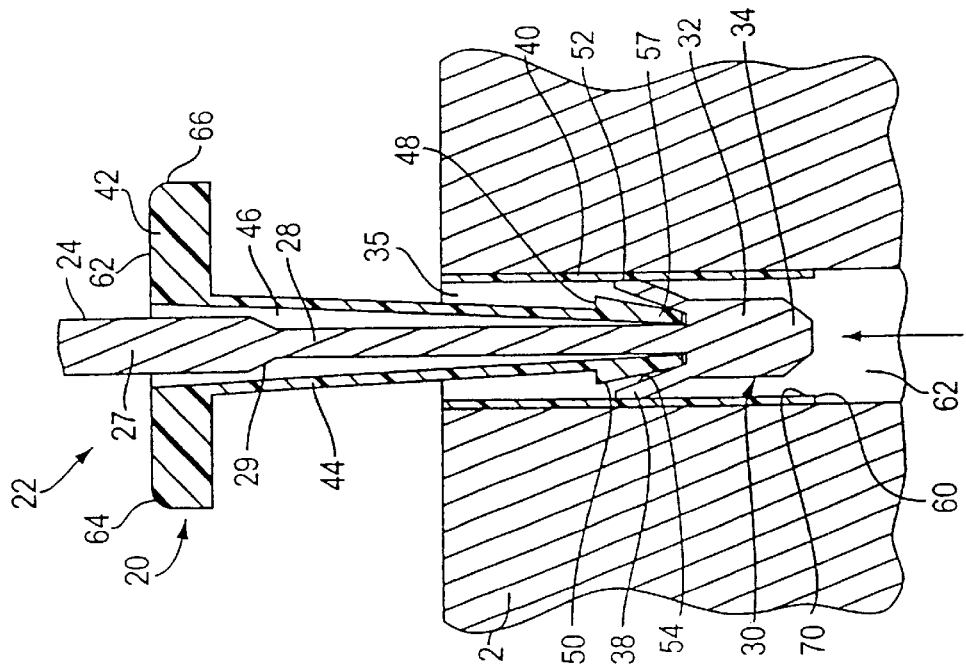
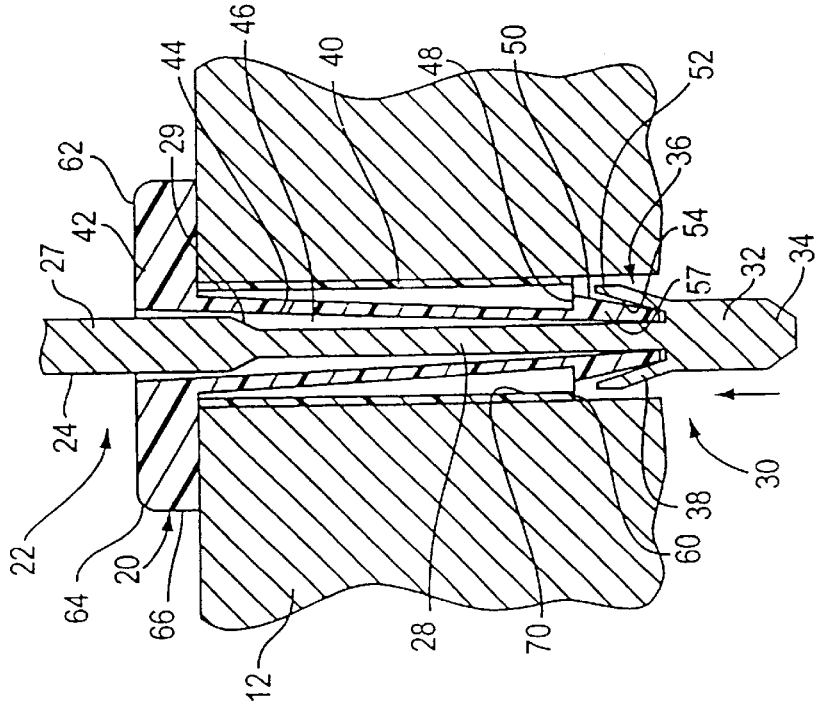

EXTRACTION TOOL FOR HEAD REST RETAINER SLEEVE

RELATED APPLICATION

This patent application claims priority to and all the benefits of U.S. Provisional Patent Application Ser. No. 60/056,539, filed Aug. 19, 1997 and entitled "Extraction Tool for Head Rest Retainer Sleeve."

TECHNICAL FIELD

The subject invention relates to an extraction tool, and more specifically, to an extraction tool for removing a head rest retainer sleeve from a seat back assembly.

BACKGROUND OF THE INVENTION

Conventional automotive vehicle seat assemblies typically include a head rest assembly for supporting the seat occupants head. The head rest is generally slidably secured to the upper portion of the seat back of the seat assembly and vertically adjustable to accommodate the varying heights of the seat occupants. A conventional seat back includes a seat back frame encased in a contoured foam cushion and trim cover. A pair of head rest retaining sleeves are locked into either an aperture or tubular member in the seat back frame for slidably receiving a respective pair of head rest support posts therein and provide the vertical adjustment of the head rest. The retainer sleeves typically include some form of locking wedge or tab for engaging and locking the sleeve to the tubular member or seat back frame.

However, a common problem is presented for the serviceability of the retainer sleeve due to the concealed locking arrangement of the sleeve and tubular member encased within the foam cushion and trim cover. In order to access, service or replace the retainer sleeve, the seat back assembly must be disassembled by removing the trim cover and foam cushion to gain access to the retainer sleeve and locking wedge engaged with the tubular member.

Therefore, it is desirable to provide a tool for engaging and releasing the locking wedges of the retainer sleeve from the tubular member and seat back frame and allow removal of the sleeve from the seat back, without necessitating complete disassembly of the trim cover and foam cushion from the seat back assembly.

SUMMARY OF THE INVENTION

The subject invention is an extraction tool for extracting a sleeve from an opening comprising an elongated body member extending between an upper end and a lower end. The upper end includes a gripping surface for gripping the extraction tool and the lower end includes an engagement extraction member having at least one flexible finger element extending outwardly from the body member toward the upper end, whereby the gripping surface positions the tool through the sleeve from a compressed position flexing the finger element within the sleeve to a pre-compressed position relaxing the finger element to engage and radially compress the sleeve allowing removal of the sleeve from the opening.

The subject invention further includes the combination of a head rest retainer sleeve and extraction tool for extracting the retainer sleeve from a seat assembly. The combination includes a tubular member seated within an opening in the seat assembly, the tubular member having a first end adjacent the opening and a second end disposed in the seat assembly. An elongated retainer sleeve is received in the tubular member and has a head portion covering the first end of the tubular member, at least one flexible locking wedge for engaging the second end of the tubular member to retain the sleeve in the tubular member and the seat assembly, and an aperture for receiving a mounting post of a head rest. An extraction tool includes an elongated body member having upper and lower ends. The upper end includes a gripping surface for positioning the extraction tool into the retainer sleeve and the lower end includes an engagement extraction member slidably received within the retainer sleeve for engaging and compressing the locking wedge to unlock the sleeve from the tubular member.

The subject invention further includes a method for removing a retainer sleeve from a tubular member in a seat assembly comprising the steps of aligning an elongated extraction tool having an upper end and a lower end with an aperture formed in a retaining sleeve; inserting the extraction tool within the aperture of the retaining sleeve; compressing an engagement extraction member having at least one flexible finger element within the aperture of the retaining sleeve; engaging at least one locking wedge on the retaining sleeve with the corresponding flexible finger; and compressing the locking wedge inwardly away from an inner wall of the tubular member to unlock the retaining sleeve from the tubular member.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A is a cross-sectional view taken along line 3—3 in FIG. 2 showing the head rest assembly removed and the extraction tool being placed into a hollow shaft in the head rest retainer sleeve;

FIG. 3B is a cross-sectional view taken along line 3—3 in FIG. 2 showing the extraction tool inserted into the hollow shaft in the head rest retainer sleeve;

FIG. 3C is a cross-sectional view taken along line 3—3 in FIG. 2 showing the extraction tool inserted into the hollow shaft beyond the end of the head rest retainer sleeve and engaged with the lower end of the retainer sleeve; and FIG. 3D is a cross-sectional view taken along line 3—3 in FIG. 2 showing the head rest retainer sleeve being removed from the top of the seat back assembly by the extraction tool.

DETAILED DESCRIPTION OF THE DRAWINGS

Figure 1:
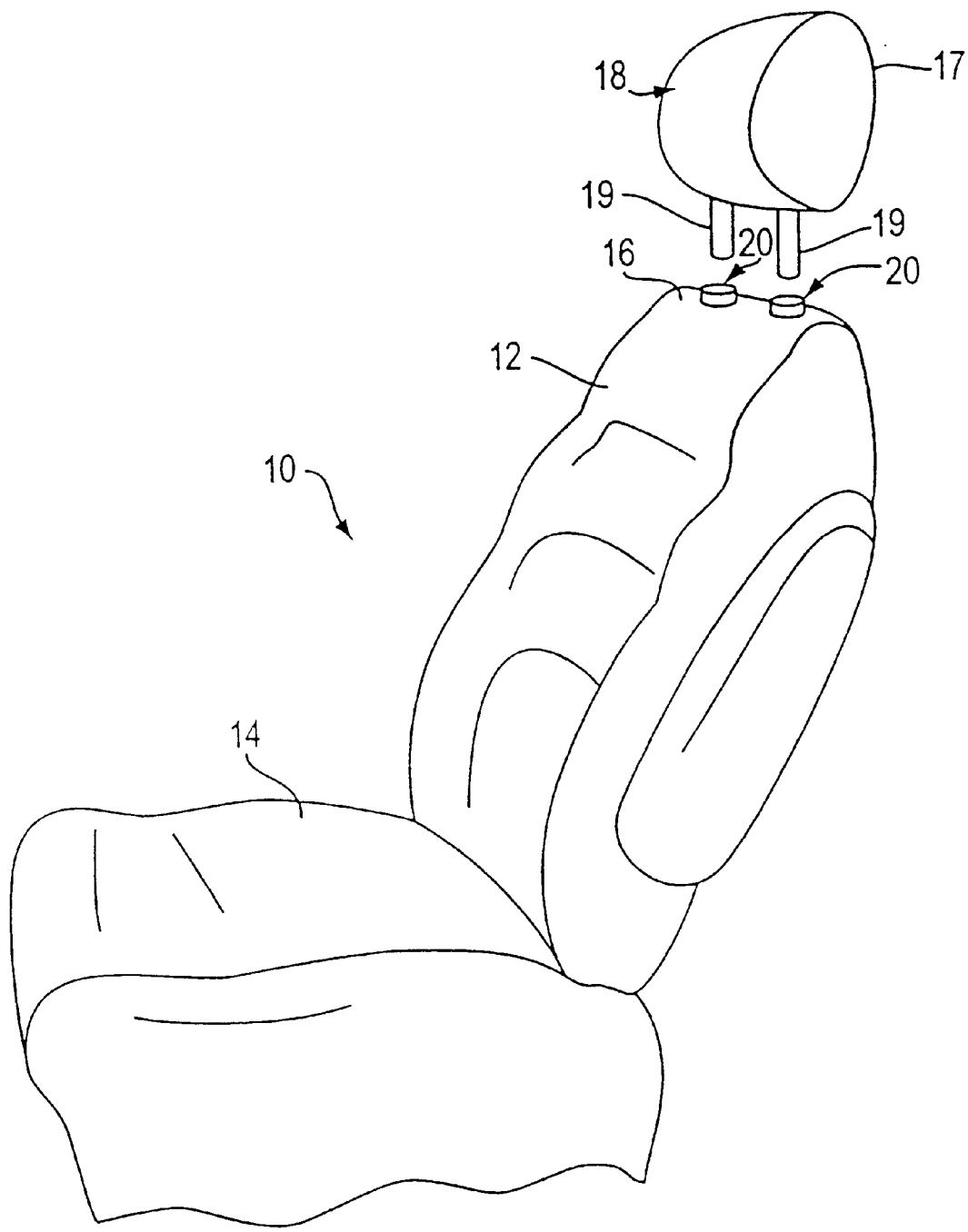
FIG. 1 is a perspective view of a vehicle seat assembly with a head rest assembly installed in the top portion of a seat back assembly.

Referring now to FIG. 1 of the drawings, there is shown therein a vehicle seat assembly 10, comprising a seat back assembly 12 and a seat bottom assembly 14. A top portion 16 of the seat back assembly 12 contains a conventionally mounted head rest assembly 18. The head rest assembly 18 includes pad 17 and downwardly extending mounting posts 19 and is mounted on the top portion 16 through head rest retainer sleeves, generally indicated at 20, which receive mounting posts 19 and allow the head rest assembly 18 to be conventionally moved upwardly and downwardly within the top portion 16 of the seat back assembly 12 as desired by the occupant.

Figure 2:
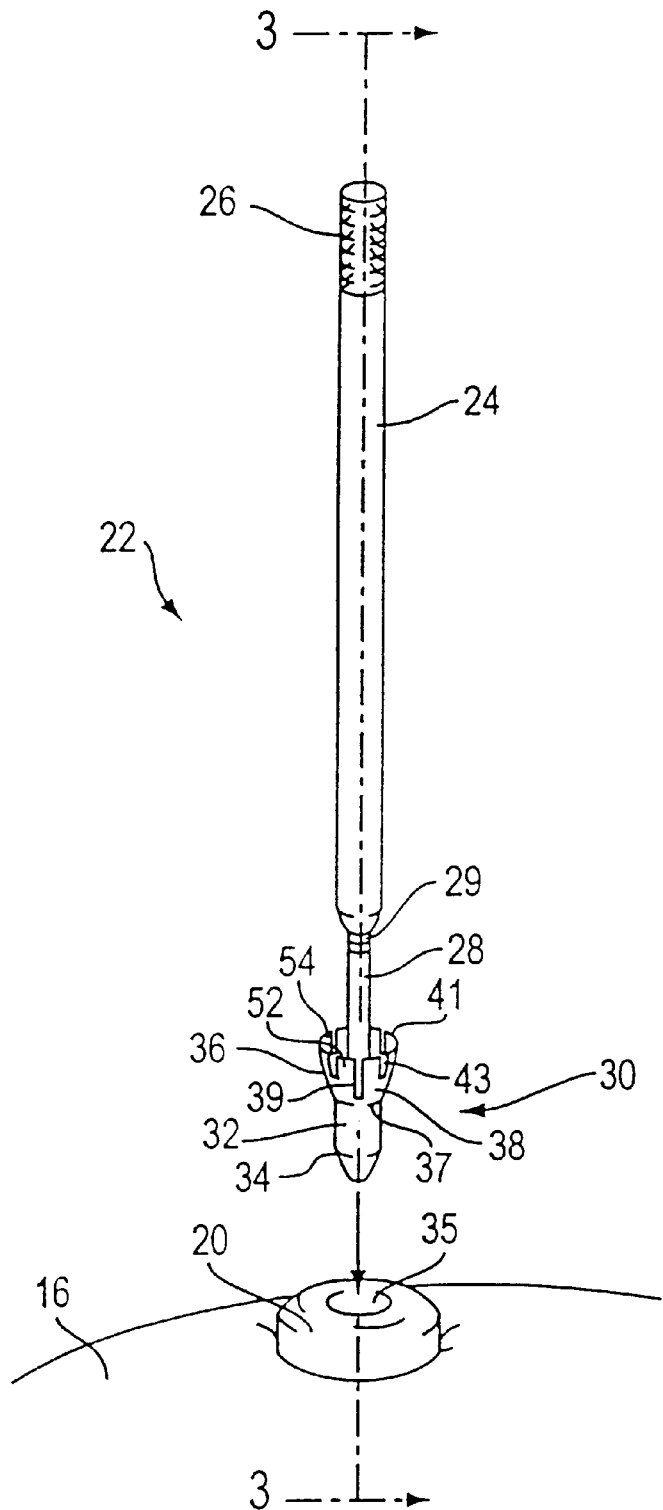
FIG. 2 is a perspective of an embodiment of the present invention showing an extraction tool positioned above a head rest retainer sleeve on a vehicle seat back assembly.

Referring now to FIG. 2 of the drawings, there is shown therein a head rest retainer sleeve extraction tool, generally indicated at 22. The extraction tool 22 is preferably made of steel and comprises an elongated, narrow, cylindrical-like body member 24 with a knurled gripping surface 26 at the uppermost end. The lower end portion 29 of body member 24 tapers inwardly forming into a smaller diameter longitudinal shaft 28 that extends into an engagement and extraction member, generally shown at 30, at the lowermost end thereof. The engagement and extraction member 30 is the means by which the head rest retainer sleeve 20 is extracted from the top portion 16 of the seat back assembly 12.

The engagement and extraction member 30 generally includes a short cylindrical central portion 32 of a diameter substantially the same as body member 24, with a beveled front end portion 34 that, operationally, is manually inserted into an aperture 35 in the top of the head rest retainer sleeve 20 to initiate removal of the retainer sleeve 20. An annular flange 37 is formed at the interconnection between the smaller longitudinal shaft 28 and the rear of engagement member 30. Protruding upwardly from annular flange 37 is a collett mechanism 36 that is slotted, as at 39, defining a series of equally-spaced flexible finger elements 38 circumferentially arranged around the outer edge of annular flange 37 and biased outwardly therefrom. An end portion 41 of each finger element 38 is split into two segments as by a slot 43, with each segment having an outer surface 52 having a substantially longitudinal extent. The outer surfaces 52 are configured circumferentially to allow the extraction tool 22 to remove retainer sleeve 20 without interference. A gripping surface 54 on the inner side of flexible fingers 38 captures the retainer sleeve 20 interiorly allowing for removal of the same.

As shown in FIG. 3A, a tubular mounting member 40 is solidly affixed longitudinally within the top portion 16 of the seat back assembly 12. The head rest retainer sleeve 20 is installed interiorly through tubular member 40 and is releasably retained therein. Retainer sleeve 20 comprises a head portion 42 and a body portion 44 extending from head portion 42. Head portion 42 has a top surface 62 that forms into an arcuate edge 64, which blends into a peripheral edge 66 extending downward and intersecting with an annular flange 68 formed on the underside thereof that communicates with the top portion 16 of seat back assembly 12.

An aperture 35, centrally located in head portion 42, extends there through and is axially aligned with a hollow cylindrical portion 46 of body portion 44 extending the full length of the retainer sleeve 20. Expanding peripherally from a lower end of body portion 44 is an upwardly facing annular flange 48 that engages a lowermost annular end 60 of tubular mounting member 40 when retainer sleeve 20 is fully inserted into member 40. Acutely angled surfaces 50 form downwardly from flange 48 creating flexible locking wedges 57 that co-act with lower end 60 of tubular mounting member 40 to lock and hold the retainer sleeve 20 in place.

When removal of head rest retainer sleeve 20 is desired, the beveled front end 34 of extraction tool 22 is inserted into aperture 35 of the head portion 42, as shown in FIGS. 3A and 3B. As the extraction tool 22 is guided through the head rest retainer sleeve 20, the flexible finger elements 38 are compressed along the inner wall 45 of cylindrical portion 46. The extraction tool 22 is inserted through the head rest retainer sleeve 20 until the extraction and engagement member 30 extends beyond the lower end of the head rest retainer sleeve 20.

As shown in FIG. 3C, when the extraction and engagement member 30 is beyond the lower end of head rest retainer sleeve 20, the gripping finger elements 38, being free of the restrictive hollow cylindrical portion 46 within the head rest retainer sleeve 20, spring open to the precompressed position. The extraction tool 22 is now positioned to engage and remove the retainer sleeve 20. More specifically, extraction tool 22 is now manually pulled upwardly whereby the inner gripping surface 54 of the finger elements 38 engage the acutely angled surfaces 50 of flexible locking wedges 57 thereby capturing the locking wedges 57. With continued upward movement, the inner gripping surface 54 of the extraction tool 22 drives upwardly against angled surfaces 50 causing the flexible locking wedges 57 to compress inwardly against extraction tool 22 longitudinal shaft 28. As the locking wedges 57 flex inwardly, the upwardly facing flange surface 48 along the top of locking wedges 57 move laterally into the hollow cylindrical portion 46. Continued lateral movement slidingly disengages the flange surface 48 from the lowermost annular end surface 60 of tubular mounting member 40, thereby unlocking the locking wedges 57 and providing free movement of retainer sleeve 20 for removal.

As can be seen in FIGS. 3C and 3D, when the locking wedges 57 disengage from tubular mounting member 40, the head rest retainer sleeve 20 is released, thereby allowing the retainer sleeve 20 to be removed from the top portion 16 of the seat back assembly 12 through tubular mounting member 40. More specifically, as the extraction tool 22 is removed upwardly, the flexible locking wedges 57 are pulled into and through the tubular mounting member 40 by the finger elements 38 of collett mechanism 36. The outer surfaces 52 of finger elements 38 are diametrically sized such that the finger elements 38 slide upwardly along the inner surface 70 of the tubular mounting member 40 without getting hung up on the lower end 60 of the tubular mounting member 40. The extraction process continues until the head rest retainer sleeve 20 is completely removed from the top portion 16 of the seat back assembly 12.

Using the extraction tool 22 to slide down into the head rest retainer sleeve 20 to capture and compress the locking wedges 57 allows the retainer sleeve 20 to be drawn out from the seat back assembly 12, thus eliminating the need to de-trim and disassemble the seat back assembly 12 which is time consuming and requires a considerable expenditure of manpower. Presently, there is no way to remove the head rest retainer sleeve 20 from the top portion 16 of the seat back assembly 12 other than to de-trim and disassemble the seat back assembly 12. The present invention offers a simple and quick solution to solve this deficiency in a cost effective manner.

The invention has been described in an illustrative manner, and it is to be understood that the terminology which has been used is intended to be in the nature of words of description rather than of limitation.

Obviously, many modifications of the present invention are possible in light of the above teachings. It is, therefore, to be understood that within the scope of the appended claims, the invention may be practiced other than as specifically described.

What is claimed is:

1. An extraction tool for extracting a sleeve from an opening comprising:

an elongated body member extending between an upper end and a lower end;

said upper end including a gripping surface; and an engagement extraction member mounted to said lower end and having at least one flexible finger element, said finger element having an outer surface and an inner gripping surface with said finger element extending outwardly from said body member toward said upper end such that said inner gripping surface is adjacent to and spaced from said body member, said tool being insertable through the sleeve with said finger element flexing to a compressed position within the sleeve and said finger element relaxing to a pre-compressed position outside of the sleeve such that said gripping surface captures and radially compresses the sleeve during removal of the sleeve from the opening.

2. The extraction tool as set forth in claim 1 further including a plurality of flexible finger elements and a plurality of first slots separating said flexible finger elements.

3. The extraction tool as set forth in claim 2 wherein said engagement extraction member includes a beveled distal end and a cylindrical central portion extending upwardly from said beveled distal end to an annular flange.

4. The extraction tool as set forth in claim 3 wherein said flexible finger elements extend upwardly and outwardly from said annular flange of said central portion away from said body member toward said upper end.

5. The extraction tool as set forth in claim 4 wherein said body member is cylindrical and further including a cylindrical longitudinal shaft having a diameter smaller than the diameter of said body member and extending from said lower end of said body member to said annular flange of said central portion.

6. The extraction tool as set forth in claim 5 wherein said flexible finger elements are spaced outwardly from said longitudinal shaft.

7. The extraction tool as set forth in claim 6 wherein said finger elements include an end portion and said first slots extend from said end portion to said annular flange of said central portion between each of said finger elements.

8. The extraction tool as set forth in claim 7 wherein said engagement extraction member further includes a plurality of second slots extending from said end portion of said finger elements toward said annular flange of said central portion between each of said first slots.

9. The extraction tool as set forth in claim 8 wherein said finger elements include an outer surface and an inner gripping surface adjacent to and spaced from said longitudinal shaft.

\* \* \* \* \*